(No Model.)

D. C. THOMAS.
NUT LOCK.

No. 537,911. Patented Apr. 23, 1895.

WITNESSES:
H. B. Bradshaw
A. L. Phelps

INVENTOR
David C. Thomas
BY
Staley and Shepherd
ATTORNEYS

UNITED STATES PATENT OFFICE.

DAVID C. THOMAS, OF GLOUSTER, OHIO.

NUT-LOCK.

SPECIFICATION forming part of Letters Patent No. 537,911, dated April 23, 1895.

Application filed January 19, 1894. Serial No. 497,370. (No model.)

*To all whom it may concern:*

Be it known that I, DAVID C. THOMAS, a citizen of the United States, residing at Glouster, in the county of Athens and State of Ohio, have invented a certain new and useful Improvement in Nut-Locks, of which the following is a specification.

My invention relates to the improvement of nut locks and the objects of my invention are to provide an improved device of this kind by means of which nuts may be securely and reliably locked in the desired positions on bolts in such manner as to prevent a reversal of the nut when the latter is not desired; to construct and apply my improved lock in a simple, reliable and inexpensive manner and to admit of the same being readily adapted for use. These objects I accomplish in the manner illustrated in the accompanying drawings, in which—

Figure 1:
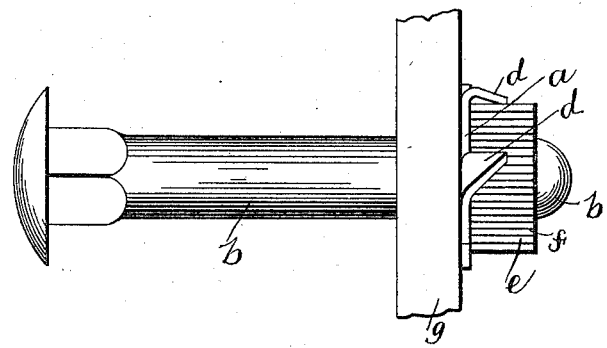
Figure 2:
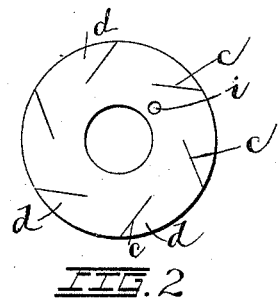
Figure 3:
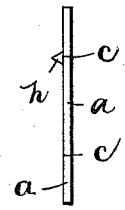
Figure 4:
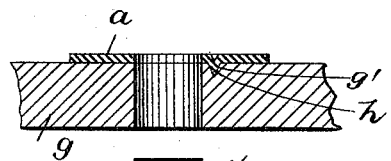
Figure 5:
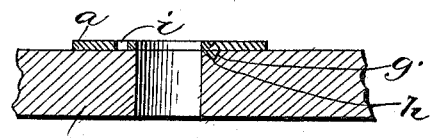

Figure 1 is a view in elevation of a bolt and nut thereon showing my improved lock applied thereto. Fig. 2 is a detail plan view of the locking washer. Fig. 3 is a side elevation of the same, and Fig. 4 is a sectional view of a portion of a railway fish-plate or other part adapted to be held by a bolt, showing in connection therewith a sectional view of my improved locking washer. Fig. 5 is a similar view showing an additional feature of the invention.

Similar letters refer to similar parts throughout the several views.

$a$ represents a disk shaped washer which is adapted to fit loosely over the threaded portion of a bolt $b$.

As indicated at $c$ the washer $a$ which is preferably formed of thin sheet metal, is provided at equidistant points on its periphery with cuts or incisions which extend tangentially inward thus separating the outer portion or margin of the disk into tongues $d$ which are capable of being bent outward in the manner and for the purpose hereinafter described.

In forming the washers $a$ I provide the same at a point or points on the outer side of the central opening with one or more outwardly projecting spurs $h$, and at another point in said washer at an equal distance from the periphery thereof I provide a small opening indicated at $i$.

As indicated at $e$ in Fig. 1 of the drawings, I preferably provide the nuts $f$ to be used in connection with my improved lock washers with parallel corrugations or notches on their outer sides.

The manner of utilizing my improved lock washer is substantially as follows: The bolt having been passed through the part or parts $g$ to be held thereby the lock washer $a$ formed as described is slipped over the outwardly projecting screw threaded portion of the bolt until the same is adjacent to the part $g$ when a suitable tool may be inserted through the washer opening $i$, said tool being drilled or driven into the part $g$ to form a socket $g'$. The tool being withdrawn, the washer may be then rotated until its spur $h$ drops into said socket. This being accomplished the nut $e$ is turned on to the bolt end in the usual manner until the lock washer is firmly clamped against the part $g$. One or more of the washer tongues $d$ formed as above described by the tangential incisions $c$ may then be bent outward in the manner indicated in Fig. 1 of the drawings, the straight edges of said tongues being preferably made to engage with the parallel notches or corrugations $e$ on the sides of the nut.

Owing to the contact and engagement formed as above described between the washer tongues and the sides of the square nut, it will be seen that the rotation of the nut in either direction must be prevented. It will thus be seen that the loss of nuts and the consequent annoyance and accidents resulting from the same working loose from parts of machinery, track rail connections and other parts will be entirely obviated.

It is evident that the engagement of the spur with the part held by the bolt will prevent any rotation of the locking washer, and that in case it is desired to remove the nut, the same may be accomplished without injury thereto by forcing the projecting tongues $d$ of the washer back to their normal position and removing the nut in the usual manner.

From the construction which I have herein described, it will be observed that a simple, inexpensive and effective lock is provided which can be readily adjusted for use and which will not only serve to prevent a nut from working off the bolt, but which will admit of the nut retaining the part or parts $g$ in a substantially loose position upon a bolt when the same is desirable.

Having now fully described my invention, what I claim, and desire to secure by Letters Patent, is—

In a nut lock the lock washer $a$ of pliable metal, tangential incisions formed as described therein, one or more spurs projecting from the rear face thereof and an opening $i$ formed in said washer body in the same circle with said spur or spurs, substantially as and for the purpose specified.

DAVID C. THOMAS.

In presence of—
J. M. ALLEN,
C. D. EDDY.